(12) United States Patent
Clements (10) Patent No.: US 8,857,521 B2
(45) Date of Patent: Oct. 14, 2014

(54) VENTING GAS

(75) Inventor: Richard Alasdair Clements, Durham (GB)

(73) Assignee: Wellstream International Limited, Newcastle-upon-Tyne (GB)

(*) Notice: Subject to any disclaimer, the term of this patent is extended or adjusted under 35 U.S.C. 154(b) by 592 days.

(21) Appl. No.: 13/131,234

(22) PCT Filed: Nov. 23, 2009

(86) PCT No.: PCT/GB2009/051587
§ 371 (c)(1),
(2), (4) Date: May 25, 2011

(87) PCT Pub. No.: WO2010/067092
PCT Pub. Date: Jun. 17, 2010

(65) Prior Publication Data
US 2011/0229271 A1   Sep. 22, 2011

(30) Foreign Application Priority Data

Dec. 8, 2008   (GB) .................................... 0822324.0

(51) Int. Cl.
*E21B 17/01*   (2006.01)
*F16L 39/02*   (2006.01)
*F16L 33/01*   (2006.01)
*F16L 11/20*   (2006.01)
*F16L 39/00*   (2006.01)

(52) U.S. Cl.
CPC ................. *F16L 11/20* (2013.01); *F16L 39/02* (2013.01); *E21B 17/015* (2013.01); *F16L 33/01* (2013.01); *F16L 39/005* (2013.01)
USPC ........................... 166/352; 166/344; 166/367

(58) Field of Classification Search
USPC ...................... 166/352, 344, 350, 367, 242.2; 138/103, 114, 116; 405/158, 224.2, 405/224.3
See application file for complete search history.

(56) References Cited

U.S. PATENT DOCUMENTS

| 3,301,277 | A | * | 1/1967 | Kelly ............................. 138/114 |
| 3,506,039 | A | * | 4/1970 | Marriott ........................ 138/114 |
| 3,735,475 | A | * | 5/1973 | Marriott ........................ 29/455.1 |
| 4,691,740 | A | * | 9/1987 | Svetlik et al. ................. 138/109 |
| 6,039,083 | A | * | 3/2000 | Loper ........................... 138/135 |

(Continued)

FOREIGN PATENT DOCUMENTS

| WO | WO00/17479 A1 | 3/2000 |
| WO | WO02/50470 A2 | 6/2002 |
| WO | WO2008/053142 A2 | 5/2008 |

OTHER PUBLICATIONS

International Search Report and Written Opinion of the International Searching Authority, mailed Apr. 19, 2010, for corresponding International Application No. PCT/GB2009/051587, 12 pages.

(Continued)

*Primary Examiner* — Matthew Buck
(74) *Attorney, Agent, or Firm* — Klarquist Sparkman, LLP (57) ABSTRACT

Apparatus and a method are disclosed for venting gas from an annulus region of a flexible pipe. The method includes the steps of depressurising a bore region of a flexible pipe and via at least one vent flow fluid communication path, venting gas from an annulus region of the flexible pipe into the bore region.

20 Claims, 6 Drawing Sheets

(56) References Cited

U.S. PATENT DOCUMENTS

| | | | | |
|---|---|---|---|---|
| 6,634,387 | B1* | 10/2003 | Glejbøl | 138/104 |
| 6,848,464 | B2* | 2/2005 | Ransom | 137/312 |
| 6,983,766 | B2* | 1/2006 | Baron et al. | 138/98 |
| 7,080,667 | B2* | 7/2006 | McIntyre | 138/104 |
| 8,256,469 | B2* | 9/2012 | Felix-Henry | 138/114 |
| 8,342,248 | B2* | 1/2013 | Hall et al. | 166/344 |
| 2009/0236845 | A1* | 9/2009 | Royston et al. | 285/14 |

OTHER PUBLICATIONS

International Preliminary Report on Patentability and Written Opinion of the International Searching Authority, mailed Jun. 23, 2011, for corresponding International Application No. PCT/GB2009/051587, 7 pages.

* cited by examiner

VENTING GAS

CROSS REFERENCE TO RELATED APPLICATIONS

This is the U.S. National Stage of International Application No. PCT/GB2009/051587, filed Nov. 23, 2009, which in turn claims the benefit of United Kingdom Application. No. GB0822324.0, filed Dec. 8, 2008. The provisional application is incorporated herein in its entirety.

The present invention relates to flexible pipes which may be used to transport fluids such as production fluids, exportation fluids or injection fluids from one location to another. In particular, but not exclusively, the present invention relates to a method and apparatus for venting gas from an annulus region of the flexible pipe into a bore region.

Traditionally flexible pipe is utilised to transport production fluids, exportation fluids or injection fluids such as oil and/or gas and/or water from one location to another. Flexible pipe is particularly useful in connecting a sub-sea location to a further sub-sea location or a sea level location. Flexible pipe is generally formed as a length of flexible pipe body and one or more end fittings at the ends of the pipe body. The pipe body is typically formed as a composite structure of tubular layers of material that form a fluid and pressure containing conduit. The pipe structure is flexible and allows relatively large deflections without causing bending stresses that impair the pipe's functionality over a desired lifetime. The pipe body is generally, but not necessarily, built up as a composite structure including metallic and polymer layers. Flexible pipe may be utilised as a flow line over land and/or at a sub-sea location. Flexible pipe may also be used as a jumper or riser.

Rough bore and smooth bore flexible pipes are known. Smooth bore flexible pipe includes a fluid retaining layer called a liner. A smooth inner surface of the liner defines a bore along which fluid is transported. However, on occasion when a bore is depressurised an accumulated pressure in an annulus region of the flexible pipe radially outside the liner can cause the liner to collapse and this leads to irreversible damage. A solution is to provide a carcass inside the fluid retaining layer. This is a so-called rough bore application and the carcass, which is formed by helically winding shaped strips in an interlocked fashion, prevents collapse of the fluid retaining layer under depressurisation of the bore by supporting the fluid retaining layer. When a carcass is used the fluid retaining layer is termed a barrier layer.

As the limits of oil and gas exploration constantly advance to even more inhospitable environments the need has arisen to design systems where flexible pipes used as risers are attached to a "disconnectable turret" mechanism. Such a detachable turret is often carried by a floating production storage and offloading (FPSO) vessel. An FPSO vessel is a type of floating tank system used in the industry to store and possibly process production fluids. The turret is disconnected and abandoned in bad weather or in the presence of ice floes as and when a need arises. Abandonment means that a riser's topmost point is submerged in seawater. Often this is for a prolonged period of time. The FPSO vessel may or may not sail away to return when the adverse conditions have passed. During the period when a riser is submerged annulus gases may continue to accumulate due to diffused gases being released out of polymer layers of the flexible pipe into the annulus region. When the turret is connected to an FPSO vessel these accumulated gases are typically exhausted to a flare system. However when the turret is detached the exhaust path is closed. Gases can thus accumulate over time. In the case of some flexible pipes and particular, though not exclusively, in smooth bore pipe designs which have a relatively low collapse resistance the accumulated annulus gases can cause collapse, blistering or other such damage of parts of the flexible pipe due to the accumulated pressure in the annulus.

It is an aim of the present invention to at least partly mitigate the above-mentioned problems.

It is an aim of certain embodiments of the present invention to enable gases accumulated in an annulus region of a flexible pipe to be vented even if the flexible pipe is detached from an exhausting system.

It is an aim of certain embodiments of the present invention to enable a detachable turret from an FPSO to be promptly depressurised and then released whilst providing a way in which gases accumulating in an annulus region subsequent to release can be vented so as to avoid collapse of a part or parts of the flexible pipe.

It is an aim of certain embodiments of the present invention to provide an apparatus and methodology which enables a solution to the accumulation of annulus gases to be retrofitted to existing flexible pipes or to be incorporated at an initial flexible pipe manufacturing stage.

According to a first aspect of the present invention there is provided a method of venting gas from an annulus region of a flexible pipe, comprising the steps of:
 depressurising a bore region of a flexible pipe; and
 via at least one vent flow fluid communication path, venting gas from an annulus region of the flexible pipe into the bore region.

According to a second aspect of the present invention there is provided a method of releasing a riser turret element from a floating production storage and offloading (FPSO) vessel, comprising the steps of:
 venting gas from an annulus region of a riser secured to the turret element according to the method as claimed in any one of claims 1 to 9; and
 releasing the turret element subsequent to a predetermined period of time subsequent to initiating the venting gas process or when a bore pressure satisfies a predetermined value.

According to a third aspect of the present invention there is provided a method of retrofitting a spool element to an end fitting of a flexible pipe, comprising the steps of:
 securing a spool element to a front end region of an end fitting of a flexible pipe in an end-to-end configuration, said spool element comprising at least one fluid flow passageway through a side wall thereof, said passageway being connectable to a vent flow fluid communication passageway in the end fitting to thereby enable gas to be vented from an annulus region of the flexible pipe into a bore region of the flexible pipe via the fluid flow passageway of the spool element.

According to a fourth aspect of the present invention there is provided apparatus for venting gas from an annulus region of a flexible pipe, comprising:
 at least one vent flow fluid communication path in fluid communication between an annulus region of a flexible pipe and a bore region of the flexible pipe.

According to a fifth aspect of the present invention there is provided a floating production storage and offloading (FPSO) comprising a releasable riser turret element, the riser turret element comprising the apparatus or flexible pipe or riser as claimed in any one of claims 14 to 23 respectively.

According to a sixth aspect of the present invention there is provided a spool element connectable to a front end region of an end fitting of a flexible pipe in an end-to-end configuration, the spool element comprising:

a generally cylindrical body portion; and
at least one fluid flow passageway extending through a side wall of the body portion.

Certain embodiments of the present invention provide a methodology and apparatus for reducing or wholly avoiding the development of pressure in an annulus region of a flexible pipe by venting gas from the annulus region into a depressurised bore region. A volume of the bore region is substantially greater than a volume in the annulus region of the flexible pipe and so a pressure in the annulus region can be decreased to within safe levels without increasing a pressure in the bore region beyond safe levels.

Certain embodiments of the present invention provide a method and apparatus which can be retrofitted to existing flexible pipes by securing a spool fitting in an end-to-end configuration with an end fitting terminating the flexible pipe. The spool fitting is connectable to the end fitting via tubing to provide a fluid communication path from an annulus of the flexible pipe to a bore region of the flexible pipe via the spool fitting.

Certain embodiments of the present invention provide an FPSO and a method of operating an FPSO which enables risers connected to the FPSO to be detached promptly enabling the FPSO to sail away so as to avoid damage. The detached risers can survive for a considerable length of time submerged without failure because annulus gases which would otherwise accumulate and cause collapse or blistering of layers of the flexible pipe are continually vented into the pipe bore so as to be kept within safe levels.

Embodiments of the present invention will now be described hereinafter, by way of example only, with reference to the accompanying drawings in which.

In the drawings like reference numerals refer to like parts.

Figure 1:
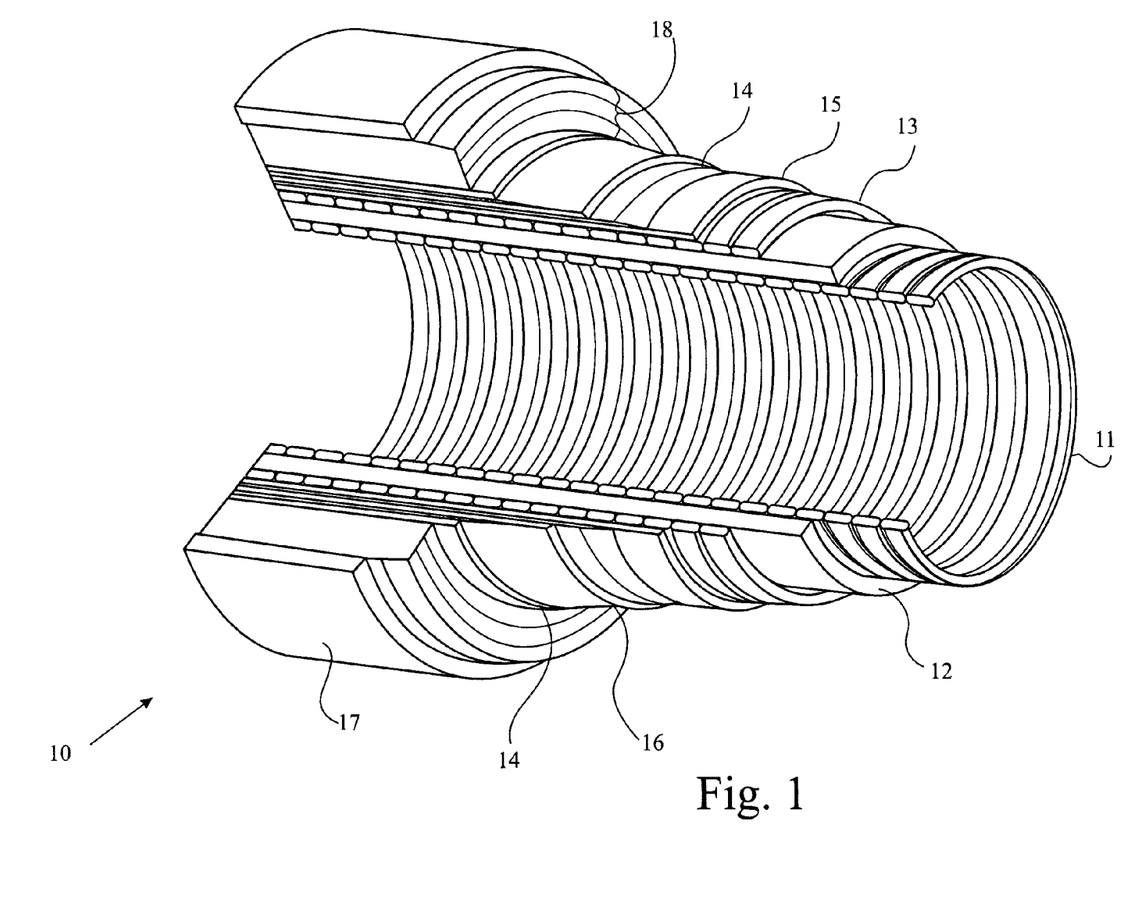
FIG. 1 illustrates flexible pipe body.

Throughout this specification reference will be made to a flexible pipe. It will be understood that a flexible pipe is an assembly of a portion of pipe body and one or more end fittings in each of which an end of the pipe body is terminated. FIG. 1 illustrates how a pipe body 10 is formed in accordance with an embodiment of the present invention from a composite of layered materials that form a pressure-containing conduit. Although a number of particular layers are illustrated in FIG. 1, it is to be understood that the present invention is broadly applicable to composite pipe body structures including two or more layers. It is to be further noted that the layer thicknesses are shown for illustrative purposes only.

As illustrated in FIG. 1, pipe body includes an inner carcass layer 11. The carcass provides an interlocked metallic construction that can be used as an inner layer to prevent, totally or partially, collapse of an internal pressure sheath 12 due to pipe decompression, external pressure, tensile armour pressure and mechanical crushing loads. It will be appreciated that embodiments of the present invention are applicable to such "rough bore" applications or to other applications where a carcass is not utilised. These are so-called smooth bore applications.

The internal pressure sheath 12 acts as a fluid retaining layer and typically comprises a polymer layer that ensures internal-fluid integrity. It is to be understood that this layer may itself comprise a number of sub-layers. It will be appreciated that when the carcass layer is utilised the internal pressure sheath is often referred to in the art as a barrier layer. When a carcass is not utilised the internal pressure sheath is referred to as a liner.

A pressure armour layer 13 is formed over the internal pressure sheath and is a structural layer with a lay angle close to 90° that increases the resistance of the flexible pipe to internal and external pressure and mechanical crushing loads. The layer also structurally supports the internal-pressure sheath and typically consists of an interlocked metallic construction.

The flexible pipe body may also include one or more layers of tape 14 and a first tensile armour layer 15 and second tensile armour layer 16. Each tensile armour layer is a structural layer with a lay angle typically between 20° and 55°. Each layer is used to sustain tensile loads and internal pressure. The tensile armour layers are counter-wound in pairs.

The flexible pipe body also includes an outer sheath 17 which comprises a polymer layer used to protect the pipe against penetration of seawater and other external environments, corrosion, abrasion and mechanical damage. One or more layers 18 of insulation may also be included.

Each flexible pipe comprises at least one portion, sometimes referred to as a segment or section of pipe body 10 together with an end fitting located at at least one end of the flexible pipe. Usually an end fitting is used at both ends of the segment of flexible pipe body. An end fitting provides a mechanical device which forms the transition between the flexible pipe body and a connector. The different pipe layers as shown, for example, in FIG. 1 are terminated in the end fitting in such a way as to transfer the load between the flexible pipe and the connector. Segments of flexible pipe may be joined together in an end-to-end arrangement to make long lengths of flexible pipe. The adjacent segments may include segments of identical flexible pipe body or segments in which the flexible pipe body has different layers and/or physical properties.

Figure 2:
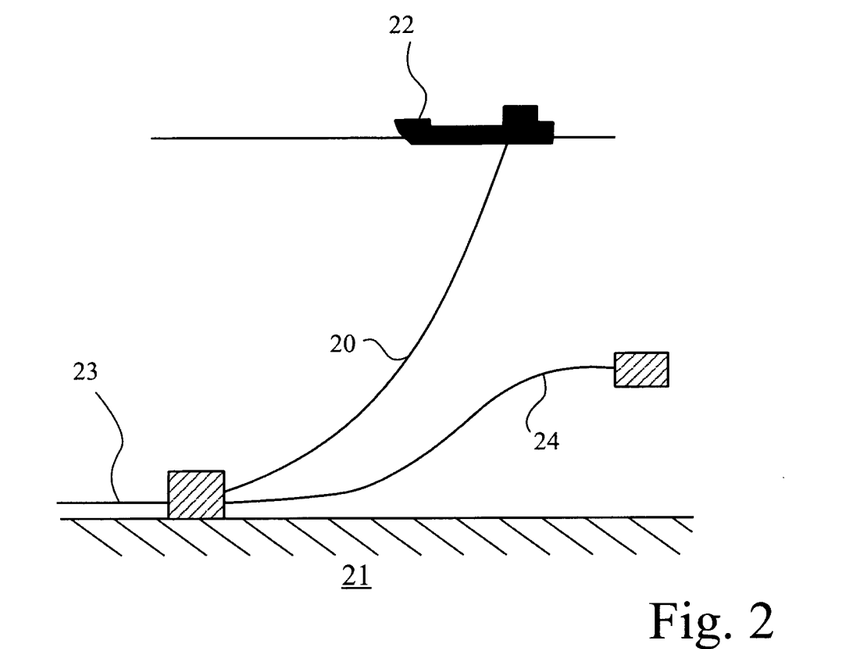
FIG. 2 illustrates a jumper, flowline and riser.

FIG. 2 illustrates a riser assembly 20 suitable for transporting production, exportation or injection fluid such as oil and/or gas and/or water from a sub-sea location 21 to a floating facility 22. For example, in FIG. 2 the sub-sea location 21 is a connection to a sub-sea flow line 23. The flexible flow line comprises a flexible pipe, wholly or in part, resting on the sea floor or buried below the sea floor. The floating facility may for example be provided by a platform and/or buoy or, as illustrated in FIG. 2, a ship. The riser 20 is provided as a flexible riser, that is to say a flexible pipe connecting the ship to the sea floor installation. Alternatively the flexible pipe can be used as a jumper 24.

Figure 3:
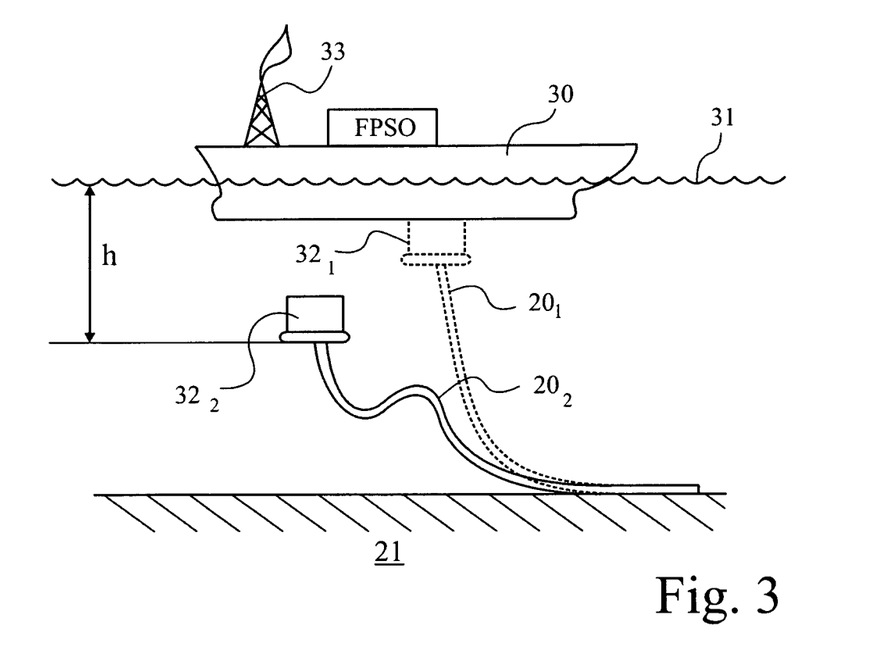
FIG. 3 illustrates an FPSO and detachable turret.

FIG. 3 illustrates how certain embodiments of the present invention can be utilised with a floating production storage and offloading (FPSO) vessel 30. It is to be understood that embodiments of the present invention are not limited to such usage but are more generally applicable wherever an annulus region of a flexible pipe must be vented subsequent to a partial or full depressurisation of a bore in the flexible pipe. As illustrated in FIG. 3 the FPSO vessel which is a well known type of vessel which acts effectively as a floating tank system and is used generally in the offshore oil and gas industry floats at the surface 31 of a stretch of seawater such as an ocean, river or sea. The FPSO vessel allows oil or other production fluids to be accumulated in the FPSO vessel until there is a sufficient collected amount for a transport tanker to offload the fluid. A riser $20_1$, $20_2$ is illustrated in FIG. 3 connecting a location at the seabed 21 to a detachable turret $32_1$, $32_2$. In a normal operating mode illustrated by the dotted lines of FIG. 3 and indicated by reference numbers having a subscript 1, the riser extends into the detachable turret which is secured to the FPSO vessel.

From time to time due to adverse weather conditions or to the presence of ice floes it is desirable for the FPSO vessel to move away from the location of the riser. In such an instance the turret 32 is detached from the FPSO vessel. The detachable turret and one or more risers connected thereto sink to a sea depth h determined by the temperature of the sea water and the natural buoyancy associated with the flexible risers and detachable turret. The depth h below the surface 31 is sufficiently deep to ensure that any icebergs or ice floes do not impact upon the detached turret $32_2$. Because of the ice floes and adverse weather conditions in some environments the detached turret will remain submerged for some time. Perhaps on occasion the detachable turret will remain submerged for more than two months.

Prior to detachment of the detachable turret 32 from the FPSO vessel 30 the flow of fluid in the flexible pipe riser must be terminated and then a bore of the riser must be depressurised. This is carried out by operating valves (not shown) as is well known in the art. The depressurisation permits some, most or all fluid to empty from the riser which would otherwise cause the riser to remain in a stressed state and isolation valves to be under pressure which is undesirable.

As noted hereinabove a problem associated with the depressurising procedure of a riser secured to a detachable turret or any situation where a bore of a flexible pipe is depressurised is that as the bore is depressurised any fluid, such as gas or liquid, which accumulates in an annulus of the flexible pipe around the inner fluid retaining layer can expand because of the pressure differential between a bore pressure and an accumulated pressure in the annulus. This can cause the inner fluid retaining layer to be damaged.

During normal operating procedures when the riser and detachable turret are connected to the FPSO vessel the accumulation of fluid in the annulus region is avoided by continually or repeatedly exhausting gas from the annulus region up to the surface vessel where it is burned via a flare system 33. The exhaust flow fluid communication path which allows accumulated gas in the annulus to be exhausted is closed prior to detachment of the detachable turret. From that point on in time gas can begin to accumulate in the annulus region. This accumulation can be particularly pronounced when transporting fluids having a high gas content. As will be appreciated this is particularly pronounced when the fluid being transported in the riser is a gas. During normal operation this gas component can diffuse into the polymer layers of the fluid retaining layers. Subsequent to detachment of the riser this diffused gas can continue to be released from the fluid retaining layer thus causing an accumulation of gas in an annulus region of the flexible pipe. In view of the relatively long length of the riser and thus the large volume of polymer which can be saturated in gas a relatively large volume of gas can be released by the polymer layers and accumulate in the annulus. Without venting in accordance with the embodiments of the present invention a pressure in the annulus region can thus increase over time. It is possible that this increase in pressure could lead to a point in time where the accumulated pressure exceeds a pressure in the bore of the flexible pipe to an extent which might cause damage.

Figure 4:
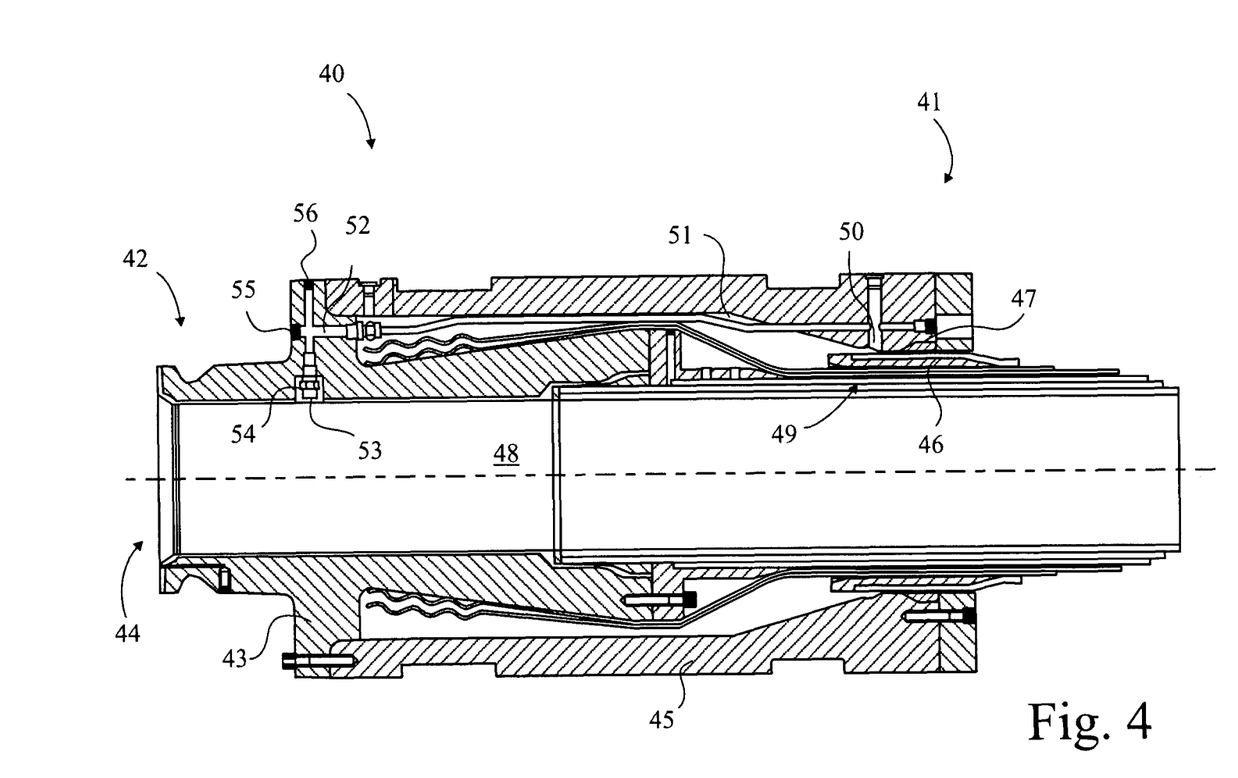
FIG. 4 illustrates an end fitting and vent flow fluid communication path.

FIG. 4 illustrates an end fitting 40 according to an embodiment of the present invention which provides a vent flow fluid communication path from the annulus into the bore so as to avoid the accumulation of hazardous pressures in the annulus. The end fitting has a back end 41 and a front end 42. An end of a portion of flexible pipe body is terminated at the back end of the end fitting. The end fitting 40 itself includes an end fitting body 43 which has a generally open mouth at a back end thereof and a further generally open mouth at a front end thereof. The front end mouth 44 is securable to a detachable turret via a clamping mechanism or some other such securing mechanism as is known in the art. An end fitting jacket 45 encloses the back end of the end fitting body 43 and seals against an outer surface of the flexible pipe body via a collar 46 and seal 47. Those skilled in the art will realise that the flexible pipe body is terminated in the end fitting by peeling away layers of the flexible pipe. The inner bore 48 of the end fitting body substantially matches an inner bore of the terminated flexible pipe body. A chamber is defined between an outer surface of the end fitting body and flexible pipe body and an inner surface of the end fitting jacket 45. This chamber is used to locate armour wires of the flexible pipe body during a terminating process. The chamber is filled with rigid material to secure the terminated wires as will also be appreciated by those skilled in the art.

A vent flow fluid communication path for venting an annulus region 49 of the flexible pipe body is defined by a back end fluid communication pathway 50 which is preformed in the end fitting jacket. A tubular conduit 51 connects the passageway 50 from the back end of the end fitting to a further passageway 52 at the front end of the end fitting body 43. A valve 53 is located in a recess 54 in the end fitting body 43. The valve is of a type able to withstand high pressures in the bore 48 during normal use. For example a relief valve manufactured by Circle Seal Controls Inc type RV05-575X can be used.

During normal operation in which the flexible pipe being used as a riser 40 is secured to a detachable turret which is connected to an FPSO vessel, the valve 53 used for venting the annulus 49 into the bore 48 is closed. The annulus 49 is continually exhausted of accumulated gas by means of an exhaust flow fluid communication path which includes a portion of the passageway 50 at the back end of the end fitting, the tubular conduit 51 which connects the back end of the end fitting to the end fitting body and the passageway 52 at the front end of the end fitting body. A first port 55 and/or a further port 56 are connectable to further tubing as will be appreciated by those skilled in the art which leads to the flare system 33 on the FPSO vessel.

When the detachable turret is to be detached from the FPSO vessel, for example when an ice floe has been identified proximate to or heading towards the FPSO vessel, the annulus 49 of the flexible pipe body is isolated from the flare system 33. This can be achieved by closing various isolation valves (not shown) or the ports 55, 56 as will be appreciated by those skilled in the art.

Prior to detachment of the turret the bore 48 of the flexible pipe and end fitting are depressurised at a rate of around 18 bar/minute or less until at least one part of the bore is at or around atmospheric pressure. This is usually, although not always, the top part.

Once depressurised to a predetermined degree the vent valve 53 is opened to open the vent flow communication path from the annulus 49 of the flexible pipe body to the bore of the flexible pipe body. The annulus volume is relatively small in relation to the volume of the bore of the flexible pipe and thus the pipe bore when depressurised can serve as a large reservoir for accumulated gases.

It will be appreciated that whilst only one vent valve 53 and associated conduit 51 are illustrated in FIG. 4 more than one valve and corresponding vent flow communication path can be provided arranged circumferentially around the cross section of the end fitting body and flexible pipe so as to help maximise the venting process and avoid failure of the venting process due to a blockage forming in the vent flow communication path.

Whilst the vent valve 53 shown in FIG. 4 is a non return valve of a mechanical type it will be appreciated that a wide variety of different types of valve can be utilised including electronic valves or the like. The vent valve opens and closes automatically or can be remotely controlled according to certain other embodiments of the present invention.

Figure 5:
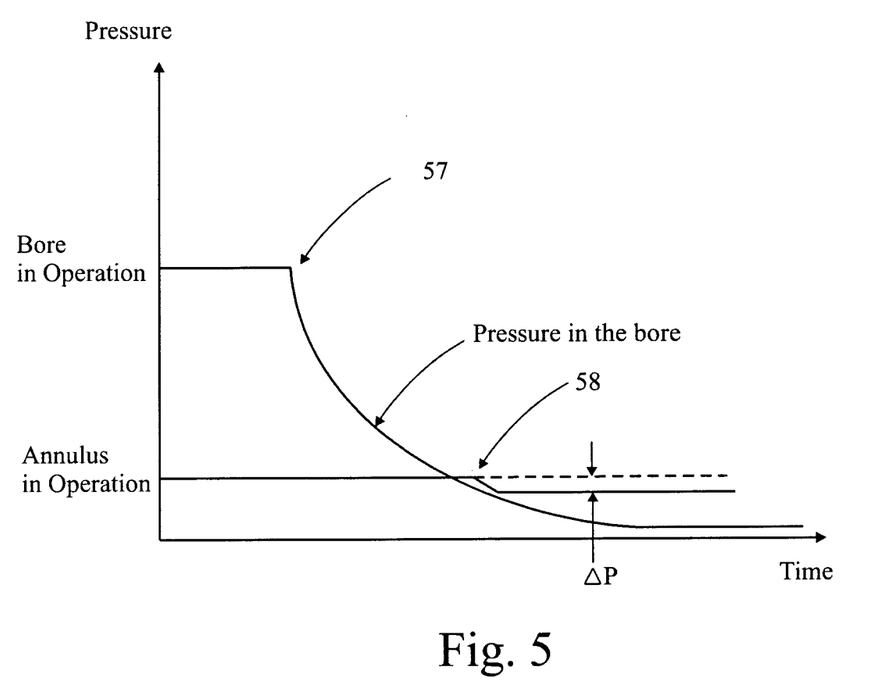
FIG. 5 illustrates bore and annulus depressurisation.

FIG. 5 illustrates the pressures in the bore and the annulus of the flexible pipe body during a depressurisation cycle. Depressurisation of the bore begins at a point 57 in time prior to detachment of the turret. The pressure in the bore gradually reduces over time and annulus depressurisation starts at a point 58 subsequent to one or more vent valves opening when a small pressure difference ΔP is detected across the vent valve. This pressure difference is typically of the order of around 2 bar or smaller and aptly not greater than 5 bar.

Figure 6:
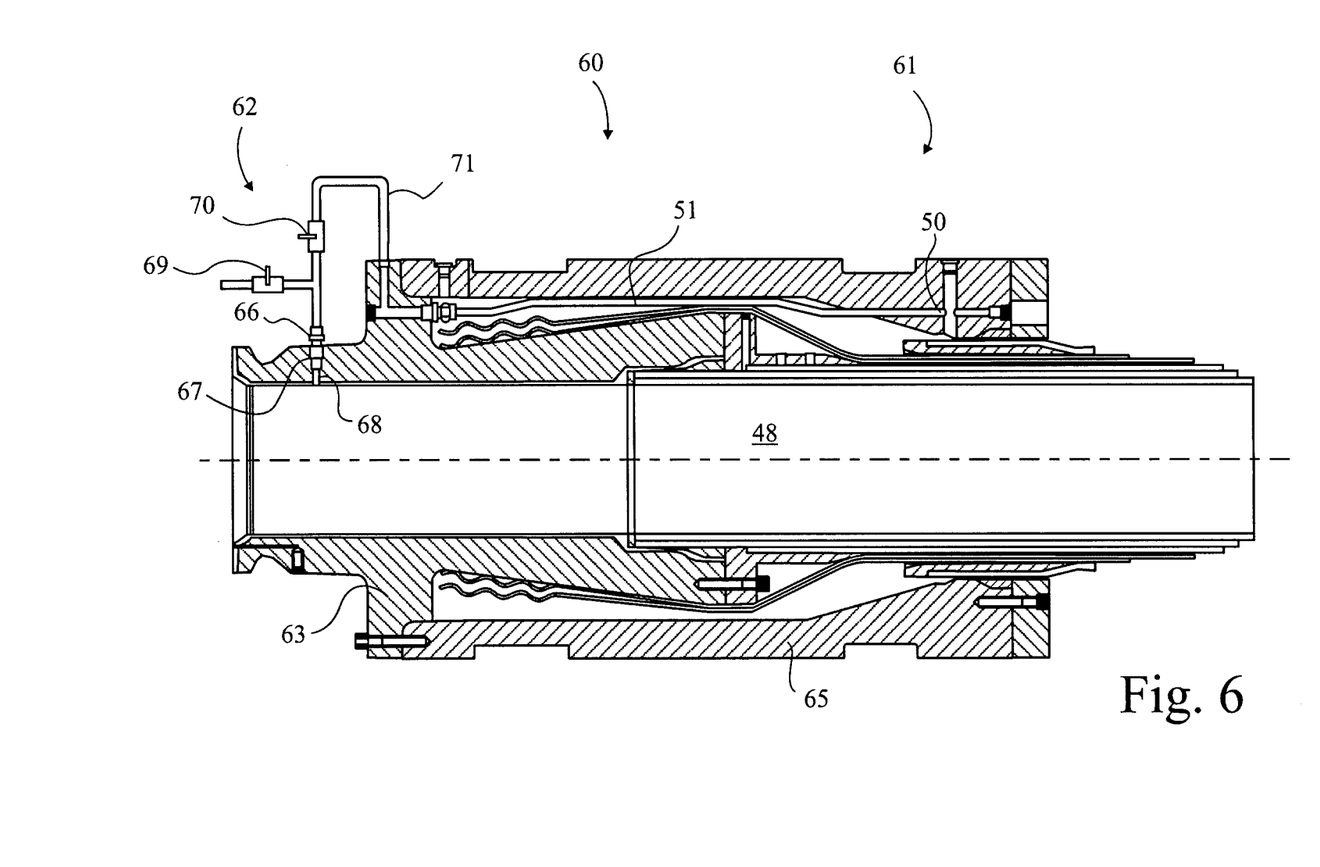
FIG. 6 illustrates an end fitting and flow fluid communication path.

FIG. 6 illustrates an alternative embodiment of an end fitting able to provide a vent flow fluid communication path for venting gas from an annulus region of a flexible pipe into a bore region 40. In many respects the end fitting 60 is similar to the end fitting 40 illustrated in FIG. 4. The end fitting 60 shown in FIG. 6 has a back end 61 and a front end 62. The end fitting 60 comprises an end fitting body 63 and an outer jacket 65.

It is to be noted that unlike the end fitting shown and described with respect to FIG. 4 which has a vent valve 53 located in an inner recess 54 proximate to the bore 48, the vent valve 66 shown in FIG. 6 which controls the opening and closing of the vent flow fluid communication path is housed on an outer recessed region 67 of the end fitting body 63. A portion of the vent flow fluid communication path between the vent valve 66 and the bore 48 is provided by a passageway 68. This passageway 68 and the downstream part of the valve 66 represent a portion of the vent flow fluid communication path which can, from time to time, become blocked. The blockages can be formed by detritus flowing along the bore 48 during a normal mode of operation or by the formation of crystals or other solid materials on the inner surface of the bore. The agglomeration of such solid material can potentially cause a vent flow fluid communication path to become blocked and thus cause failure of the vent flow process venting an annulus region into the bore region. For this purpose a high pressure source (not shown) can be connected in a purge flow fluid communication path with the valve 66 and passageway 68 by a purge flow isolation valve 69. An annulus isolation valve 70 is also provided to isolate the annulus from the high pressure source during a purging mode of operation.

During normal modes of operation in which the turret is attached to the FPSO accumulated gas in the annulus of the flexible pipe is exhausted to a flare system on the FPSO via an exhaust flow fluid communication path. This exhaust flow communication path is provided by the passageway 50 in the back end of the end fitting jacket, the tubular conduit 51 connecting the jacket passageway 50 to the end fitting body 63 at the front end of the end fitting and then through external tubing 71 through an open annulus isolation valve 70 and open purge flow valve 69. During this normal operation the vent flow valve 66 remains closed.

When the detachable turret is to be detached from the FPSO a bore 48 is depressurised via a controlled process. Aptly the bore is depressurised at a rate of 18 bar/minute or less. If there is time or if it is believed that a part of the vent flow fluid communication path may be blocked the annulus isolation valve 70 is closed and a high pressure source, such as a cylinder of high pressure air is connected at the surface vessel and this high pressure blows backwards into the bore 48 through the open purge flow isolation valve 69 and the valve 66 also used during the venting process. The high pressure of the purge flow opens the valve 66. The annulus is isolated from this overpressure so as to avoid damage by the closed annulus isolation valve 70. The high pressure source is connected for a predetermined period of time so as to blow any accumulated debris or solid matter blocking the vent flow passageway 68 or vent valve 66 into the annulus to clear the pathway. Subsequent to purging the path in this manner the purge flow isolation valve 69 is closed and the annulus isolation valve 70 opened so as to provide the vent flow fluid communication path when the detachable turret is detached. The vent flow path can then be utilised to continually vent any gases accumulating in the relatively small volume annulus region into the much larger volume bore region. By selectively opening and closing the annulus isolation valve the venting process can optionally be made a repeated rather than continual process.

Figure 7:
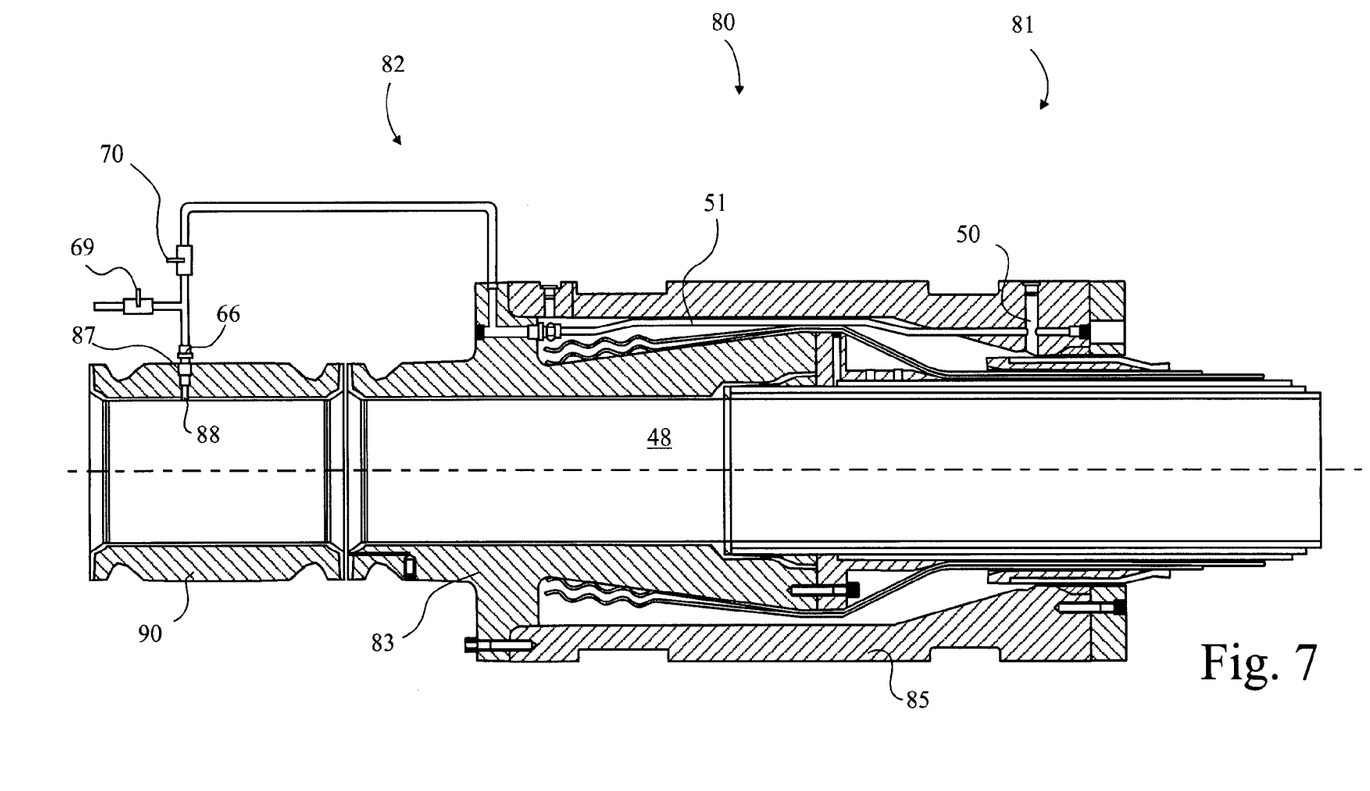
FIG. 7 illustrates an end fitting and flow fluid communication path.

FIG. 7 illustrates a further embodiment of the present invention illustrating how a spool can be secured to the front end of a conventional end fitting 80. The conventional end fitting 80 has a back end 81 and front end 82 and an end fitting body 83 and end fitting jacket 85. In this sense FIG. 7 illustrates how an embodiment of the present invention can be utilised to retrofit an element to an existing end fitting to provide a vent flow fluid communication path to enable an annulus region of an existing flexible pipe to be vented into the bore. As illustrated in FIG. 7 a purge flow isolation valve 69 and annulus isolation valve 70 are utilised together with a vent flow valve 66 which rests in a recess. In this embodiment, however, the vent flow valve 66 rests in a recess 87 on an outer cylindrical surface of a spool. A passageway 88 connects the vent valve 66 to the inner bore 48. The illustrated spool 90 is a substantially cylindrical element secured in an end-to-end configuration with the end fitting body 83. It will be appreciated that the spool element can have any particular shape. The spool has an inner bore substantially matching the bore diameter of the end fitting and flexible pipe. The spool also carries a vent valve and passageway and is connectable to a conventional end fitting body 83 via an annulus isolation valve 70 and appropriate connecting tubing to a port of the end fitting body or end fitting jacket 85.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of venting gas from an annulus region of a flexible pipe during a period when a bore region of the flexible pipe is depressurised, comprising the steps of:

depressurising a bore region of a flexible pipe;

releasing the flexible pipe from a floating production and storage offloading (FPSO) vessel; and then opening a vent valve to vent gas from an annulus region of the flexible pipe into the bore region, via at least one vent flow fluid communication path, when the bore region is depressurized;

when a pressure difference between a bore pressure in the bore region and an annulus pressure in the annulus region satisfies a predetermined relationship as the bore region is depressurised, opening the vent valve to thereby connect the annulus region to the bore region via a respective vent flow fluid communication path;

prior to opening the vent valve, closing at least one exhaust valve to thereby disconnect the annulus region from an exhaust flow fluid communication path.

2. The method as claimed in claim 1, further comprising the steps of:

depressurising the bore region prior to the release of a detachable turret from the floating production and storage offloading (FPSO) vessel.

3. The method as claimed in claim 2, further comprising the steps of:

releasing the detachable turret from the FPSO vessel.

4. The method as claimed in claim 1, further comprising the steps of:

depressurising the bore region at a rate of 18 bar/minute or less.

5. The method as claimed in claim 1, further comprising the steps of:

venting gas from the annulus region to the bore region via a plurality of vent flow fluid communication paths, each being opened and closed via a respective vent valve.

6. A method of releasing a riser turret element from a floating production storage and offloading (FPSO) vessel, comprising the steps of:

venting gas from an annulus region of a riser secured to the turret element according to the method as claimed in claim 1; and releasing the turret element subsequent to a predetermined period of time subsequent to initiating the venting gas process or when a bore pressure satisfies a predetermined condition.

7. A method of venting gas from an annulus region of a flexible pipe during a period when a bore region of the flexible pipe is depressurised, comprising the steps of:

depressurising a bore region of a flexible pipe;

releasing the flexible pipe from a floating production and storage offloading (FPSO) vessel; and then opening a vent valve to vent gas from an annulus region of the flexible pipe into the bore region, via at least one vent flow fluid communication path, when the bore region is depressurized;

when a pressure difference between a bore pressure in the bore region and an annulus pressure in the annulus region satisfies a predetermined relationship as the bore region is depressurised, opening the vent valve to thereby connect the annulus region to the bore region via a respective vent flow fluid communication path, wherein a portion of the vent flow fluid communication path comprises a fluid communication path portion between the vent valve and the bore region, the method further comprising the steps of:

prior to venting gas from the annulus into the bore region, providing positive pressure at an upstream region of the fluid communication path portion to thereby blow blockages from the fluid communication path portion into the bore region.

8. The method as claimed in claim 7, further comprising the steps of:

providing the positive pressure by connecting a high pressure gas source to the upstream region of the fluid communication path portion.

9. A method of venting gas from an annulus region of a flexible pipe during a period when a bore region of the flexible pipe is depressurised, comprising the steps of:

depressurising a bore region of a flexible pipe;

releasing the flexible pipe from a floating production and storage offloading (FPSO) vessel; and then opening a vent valve to vent gas from an annulus region of the flexible pipe into the bore region, via at least one vent flow fluid communication path, when the bore region is depressurized; and securing a spool element to a front end region of an end fitting of the flexible pipe in an end-to-end configuration, said spool element comprising at least one fluid flow passageway through a side wall thereof, said passageway being connectable to the vent flow fluid communication path in the end fitting to thereby enable gas to be vented from the annulus region of the flexible pipe into the bore region of the flexible pipe via the fluid flow passageway of the spool element.

10. The method as claimed in claim 9, further comprising the steps of:

connecting the fluid flow passageway of the spool element to the vent flow fluid communication path of the end fitting via a tubular conduit element.

11. The method as claimed in claim 10, further comprising the steps of:

connecting the tubular conduit element to the spool element via a vent valve supported by the spool element.

12. A flexible pipe, comprising:

a flexible pipe body comprising a liner and an outer sheath;

an end fitting at each end of the flexible pipe body, each end fitting comprising an end fitting body and an end fitting jacket;

a vent flow fluid communication path in fluid communication between an annulus region of the flexible pipe and a bore region of the flexible pipe at each end of flexible pipe body, wherein each said vent flow fluid communication path comprises:

a first bore portion provided at a back end region of the respective end fitting jacket;

a second bore portion provided at a front end region of the respective end fitting body;

and a fluid conducting tube connecting the first bore portion to the second bore portion.

13. The flexible pipe as claimed in claim 12, further comprising:

at least one vent valve arranged to open to connect the annulus region to the bore region via a respective vent flow fluid communication path when a pressure difference between a bore pressure in the bore region and an annulus pressure in the annulus region satisfies a predetermined relationship as the bore region is depressurised.

14. The flexible pipe as claimed in claim 12, wherein each vent flow fluid communication path is opened or closed via a respective vent valve.

15. The flexible pipe as claimed in claim 13 wherein, in a closed mode of operation, each valve is able to withstand downstream pressures of 100 bar or more.

16. The flexible pipe as claimed in claim 12, wherein:
the annulus region comprises an annular region between an outer surface of the liner and an inner surface of the outer sheath.

17. The flexible pipe as claimed in claim 12, wherein:
each fluid conducting tube comprises an exhaust flow fluid communication path used as an exhaust flow path for gases accumulated in the annulus region when the bore is pressurised.

18. The flexible pipe as claimed in claim 12, wherein:
each vent flow fluid communication path comprises a still further bore portion connecting a vent valve located in the respective end fitting body to an exit port region on the respective end fitting body.

19. A riser comprising the flexible pipe as claimed in claim 12.

20. A floating production storage and offloading (FPSO) vessel comprising a releasable riser turret element, the riser turret element comprising the flexible pipe of claim 12.

* * * * *